May 7, 1957   J. H. STARR   2,791,127
GEARING

Original Filed April 2, 1949   6 Sheets-Sheet 2

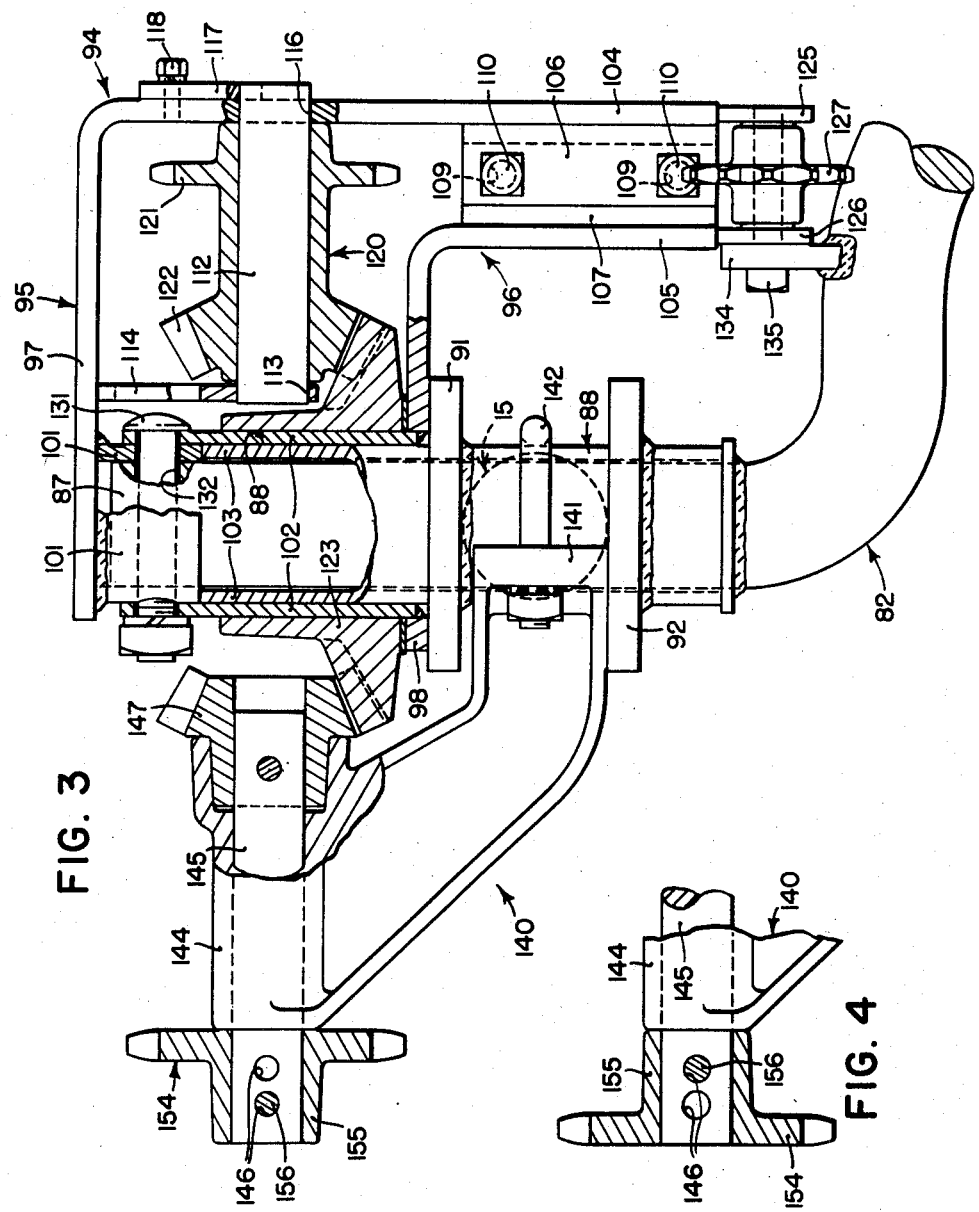

May 7, 1957 J. H. STARR 2,791,127
GEARING

Original Filed April 2, 1949 6 Sheets-Sheet 6

United States Patent Office 2,791,127
Patented May 7, 1957

2,791,127

GEARING

John H. Starr, Dodge, Wis., assignor to John Deere Van Brunt Company, Horicon, Wis., a corporation of Wisconsin Original application April 2, 1949, Serial No. 85,159, now Patent No. 2,695,576, dated November 30, 1954. Divided and this application October 26, 1953, Serial No. 388,363

8 Claims. (Cl. 74—385)

This application is a division of my copending application, Serial No. 85,159, filed April 2, 1949, for Seeding Attachment for Disk Tillers.

The present invention relates generally to agricultural implements and more particularly to planters and similar machines.

The object and general nature of the present invention is the provision of a new and useful seeding attachment adapted to be mounted on disk tillers and similar ground-working machines. More particularly, it is an important feature of this invention to provide a new and improved seeding attachment adapted to be mounted on a disk tiller and operated from one of the ground wheels of the tiller. It is also an important feature of this invention to provide a seeding attachment with new and improved means for driving the seeding mechanism through a connection with the castering land wheel, which connection does not appreciably interfere with the castering movements of the ground wheel.

Still further, another feature of the present invention is the provision of an auxiliary gear change unit adapted to be interposed between the ground wheel drive and the seeding mechanism so as to provide for changing the rate of flow of the seed, as desired.

These and other objects and advantages of the present invention will be apparent to those skilled in the art after a consideration of the following detailed description, taken in conjunction with the accompanying drawings, in which:

Figure 3 is a fragmentary detail view of the drive mechanism associated with the castering ground wheel support, corresponding generally to a view taken along the line 3—3 of Figure 2.

Figure 4 is a fragmentary view showing one of the optional positions of the drive sprocket arranged to operate with the speed-change unit shown in Figures 7 and 8.

Figure 7:
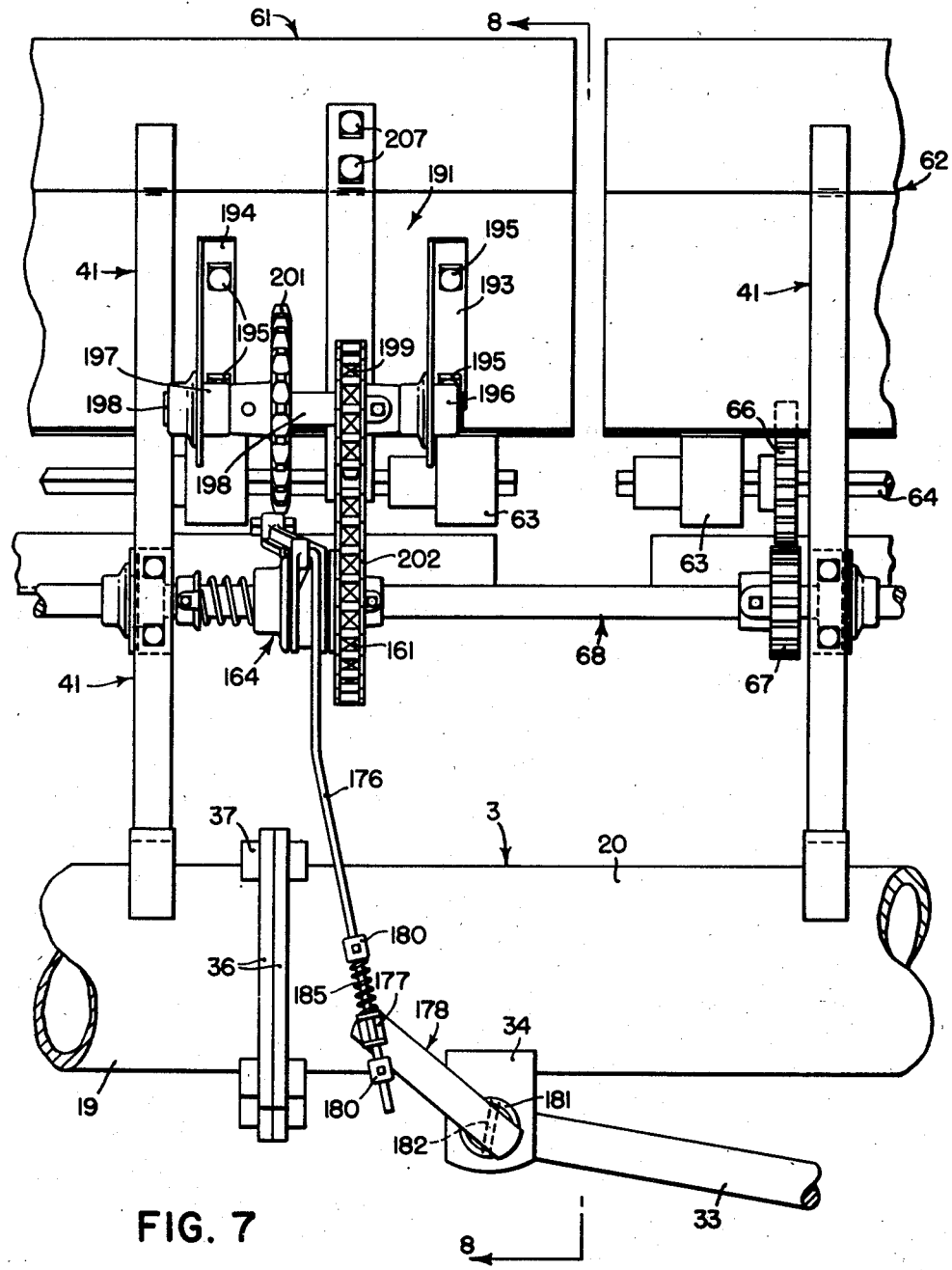
Figure 7 is a fragmentary front elevational view showing the speed-reducing jackshaft unit adapted to be used when it is desired to reduce the quantity of seed sown per acre.
Figure 8:
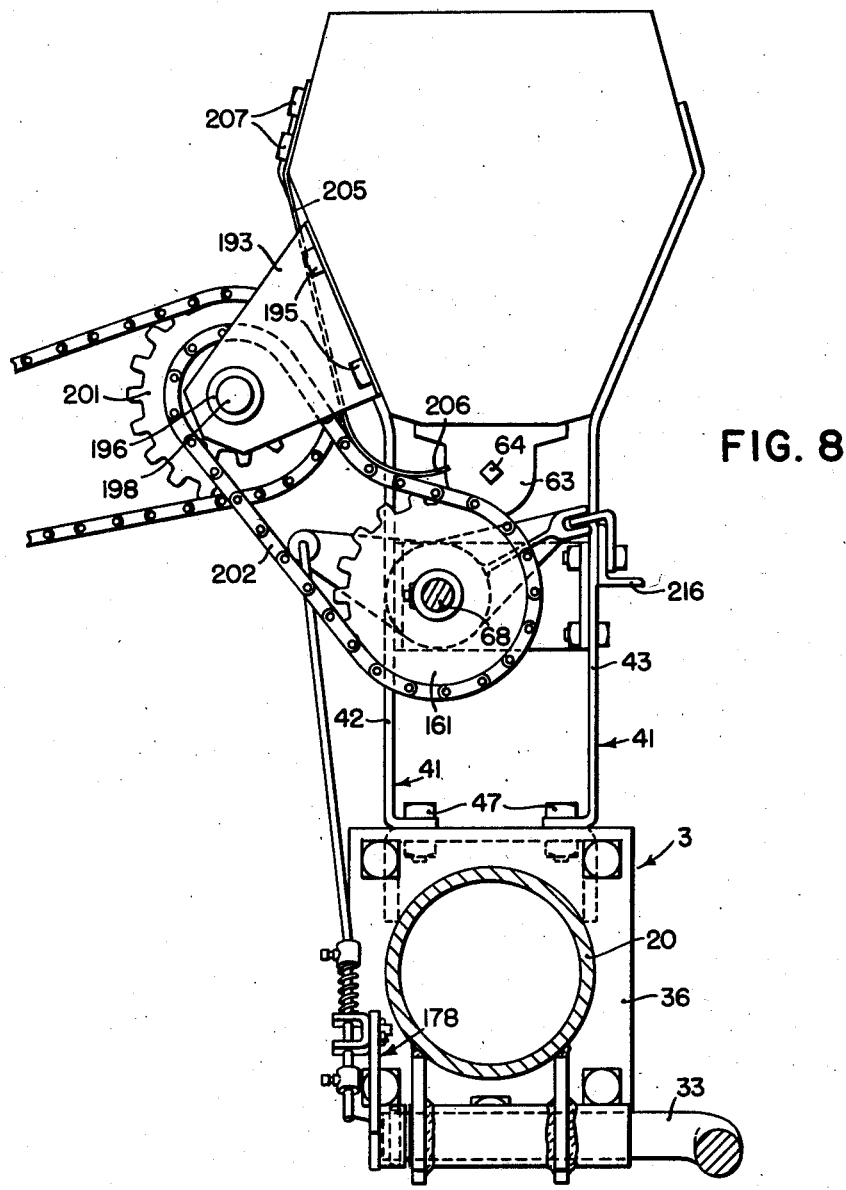
Figure 8 is an end view of the mechanism shown in Figure 7, corresponding generally to a section taken along the line 8—8 of Figure 7.

Referring now particularly to Figures 7 and 8, the seeding attachment, in which drive means incorporating the principles of the present invention have been provided, is indicated in its entirety by the reference numeral 1 and is shown as mounted on a disk tiller which is indicated in its entirety by the reference numeral 2. The disk tiller 2 comprises a main frame 3, together with other parts not shown, such as a plurality of axially aligned gangs of tiller disks and supporting wheels. The above-mentioned supporting wheels also include a rear castering land wheel 14 (Figure 2) which is pivotally mounted for lateral swinging movement in a land wheel bracket 15 (Figures 2 and 9) that also forms a part of the frame 3. Preferably, the frame 3 includes an elongated pipe frame member 17 which is made up of a main pipe frame member 18 and one or more auxiliary pipe frame members 19 and 20. The land wheel bracket 15 has its lower and rear portions connected with the associated frame pipe section by means including upper and lower lugs 25 and held rigidly against lateral movement relative thereto by any suitable means, such as an arm 26 (Figure 2) fixed to the bracket 15 and engaging a lug 27 on the associated pipe frame member. In this way, the various pipe frame members and the wheel-supporting brackets form a rigid part of the main frame 3.

Each disk gang is connected for general vertical movement relative to the main frame 3 by means of a pair of bail members 33, the forward end portions 35 of which are rockably received in bearing means 34 welded or otherwise fixed to the lower side of the associated pipe frame member. The rear bail member of each disk gang unit is link-connected with the front bail of the next rearward disk gang, whereby contiguous ends of adjacent gangs move upwardly or downwardly together relative to the main frame 3. Suitable means, such as, for example, mechanism like that shown in the copending application, Serial No. 742,234, filed April 18, 1947, by Walter H. Silver and John I. Cantral, now U. S. Patent 2,648,270, is provided for simultaneously swinging all of the bail members 33 upwardly or downwardly, each relative to the disk tiller frame 3 about the transverse axis formed by the associated bail and portion 35 (Figure 6), for raising or lowering the disk gangs, for adjusting the depth of operation and for shifting the gangs into and out of their transport position. Preferably, the raising and lowering means includes one or more springs whereby contiguous ends of adjacent gangs may move upwardly or downwardly relatively to the other gang units whereby the machine readily accommodates passage of the machine over uneven ground. As will be explained later in detail, the swinging action of at least one of the bail members when the disks are raised and lowered is made use of in controlling the drive to the feeding mechanism of the seeding attachment.

The main frame 3 of the disk tiller includes means for rigidly interconnecting the frame pipe members 18, 19 and 20. To this end, adjacent ends of the pipe members are provided with flanges 36 which are apertured to receive connecting bolts 37. Preferably, also, each of the pipe members includes wheel-bracket-receiving lugs 25 so that the land wheel 14 and associated parts may be connected with any one of the pipe members, thereby providing for increasing or decreasing the width of the machine by making it possible to take out or add additional disk gang units and associated frame pipe members. The connections between adjacent disk gang bails are so constructed and arranged as to be readily connectible and disconnectible to facilitate the addition to or removal of the frame and gang units.

Figure 6:
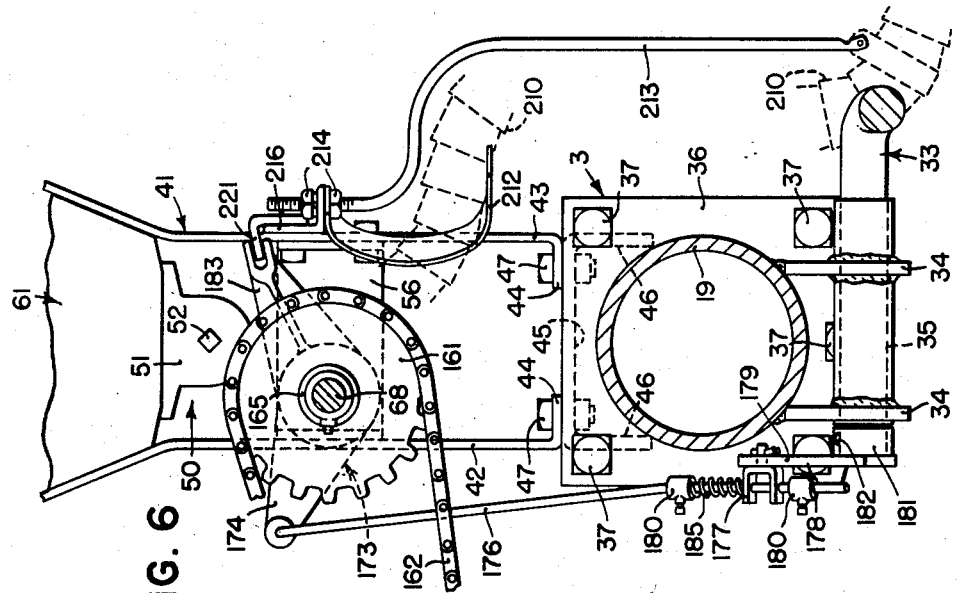
Figure 6 is an end view of the clutch and clutch control mechanism shown in Figure 5, corresponding generally to a section taken along the line 6—6 of Figure 5.
Figure 5:
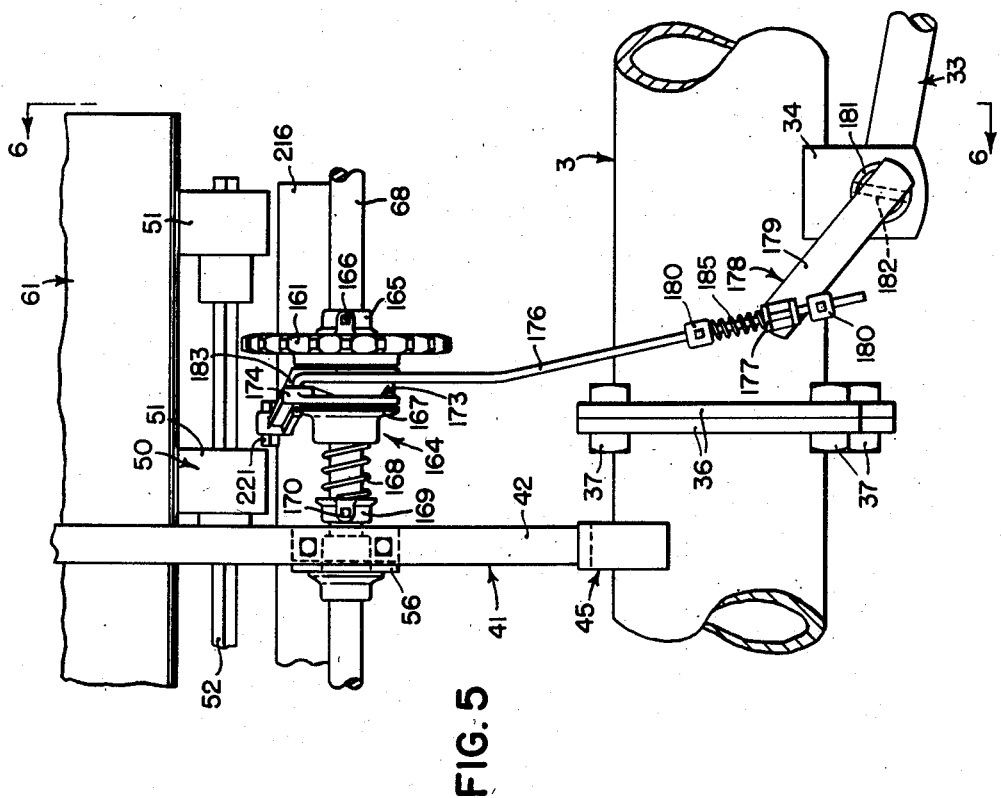
Figure 5 is a fragmentary elevational view of the seeding clutch and its control by one of the bails swingably connecting a disk gang to the tiller frame.

The seeding attachment, with which the present invention is more particularly concerned, will now be described. The seeding attachment 1 includes a main seed box (not shown) which is supported on the main pipe frame member 18 by means of a plurality of supporting brackets that are not shown but which are substantially identical with those shown at 41 in Figures 5–8 as supporting auxiliary seed boxes referred to below. As best shown in Figure 6, each hopper-supporting bracket 41 comprises front and rear strap members 42 and 43 having lower inturned portions 44 which are arranged to be mounted on a U-shaped support, preferably in the nature of a strap 45 having its downturned ends 46 welded to the pipe member 18. The upper ends of the bracket straps 42 and 43 are shaped to receive the hopper or seed box in supporting relation. The lower inturned portions 44 are apertured to receive connecting bolts 47, as best shown in Figure 6. The lower portion of each seed box carries seeding mechanism 50 of conventional construction which includes a plurality of seed-delivering mechanisms 51 and a shaft 52 which extends along the bottom of the seed box for driving the seed-delivering mechanisms 51. Each seeding unit includes a jackshaft section which is supported on the associated supporting brackets 41 by bearing plates 56 (Figure 5).

The seeding attachment also includes one or more auxiliary seeding attachment units in the form of hoppers or seed boxes, as shown at 61, 62, etc. Each of these auxiliary seed boxes are of substantially the same construction and therefore a description of one will suffice. Each of the auxiliary seed boxes includes an auxiliary seed box 60 having a plurality of seed-distributing mechanisms 63 actuated by a seeding shaft 64, and the latter is driven by a gear 66 meshing with a gear 67 on the adjacent jackshaft section. The seeding shaft 64 of the auxiliary unit 62 is driven by an auxiliary shaft 68 that is interconnected with the main shaft by means of a quick detachable connection which may be of any suitable construction.

The main auxiliary jackshaft sections constitute a jackshaft which is adapted to be driven, according to the principles of the present invention, from the castering land wheel of the tiller, and the connections for driving the jackshaft from the land wheel 14 will now be described.

Figure 1:
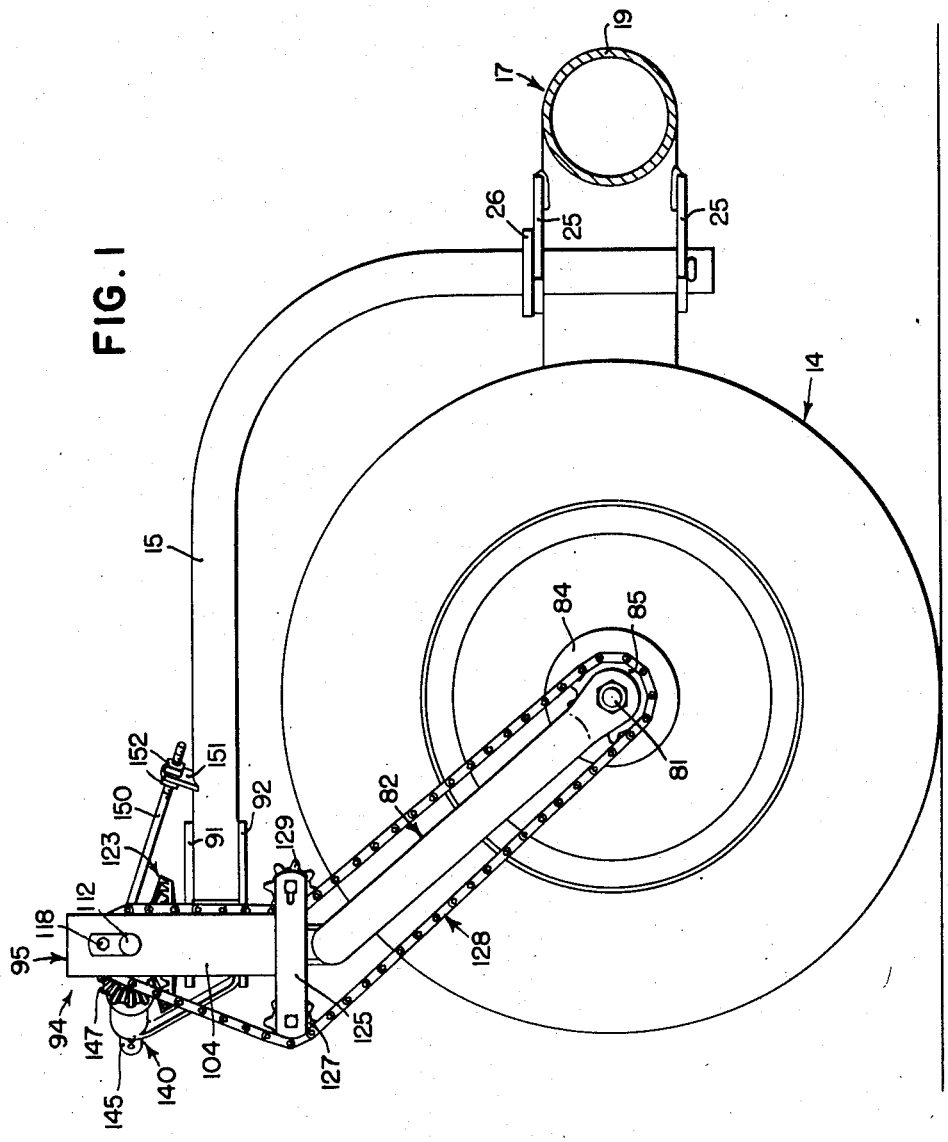
Figure 1 is a side view of the rear land wheel of a disk tiller in which the principles of the present invention have been incorporated, the view also showing the supporting bracket and drive parts associated with the land wheel.
Figure 2:
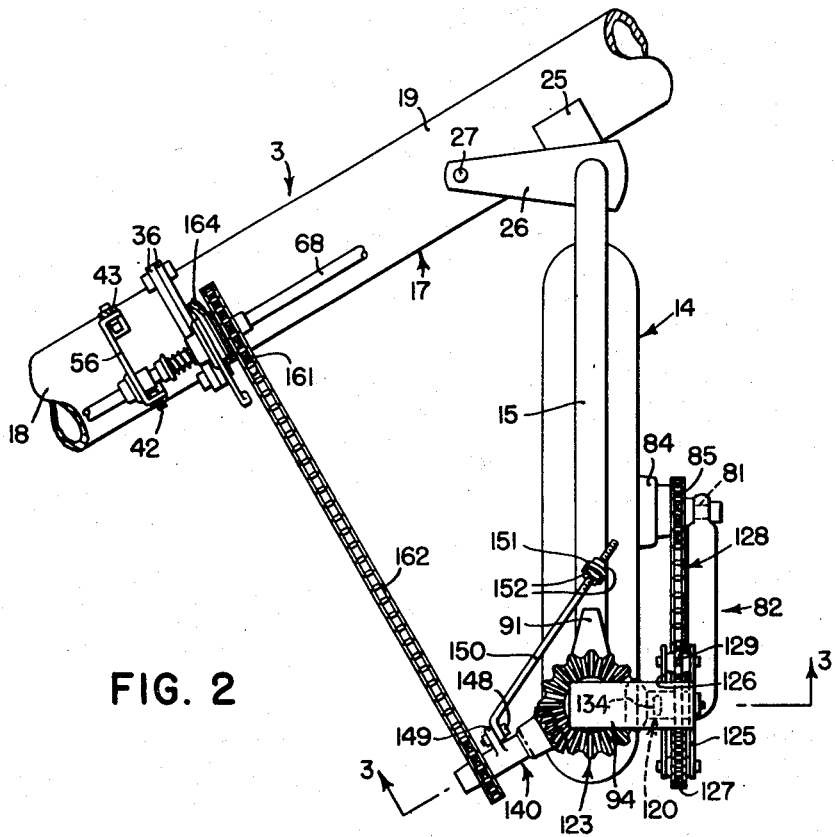
Figure 2 is a fragmentary plan view of the rear land wheel and associated parts shown in Figure 1, certain parts being broken away in order to show certain portions of the driving connections between the land wheel and the seeding mechanism of the seeding attachment somewhat more clearly.

The land wheel 14 is shown as mounted for rotation on a stub shaft 81 that forms a part of the castering wheel spindle which is indicated in its entirety by the reference numeral 82. Secured to the laterally outer side of the wheel 14 is a drive sprocket bracket 84 which carries a drive sprocket 85. The upper end of the castering wheel spindle 82 includes a vertically extending section 87 that is disposed for swinging movement within a vertical sleeve 88 which forms a part of the wheel bracket 15 and is connected to the main body of the latter member by upper and lower plates 91 and 92 preferably welded to the sleeve 88 and to the main body of the wheel bracket 15. The upper end of the spindle section 87 extends generally vertically upwardly beyond the sleeve 88 and receives a stub shaft support 94. The support 94 comprises a pair of L-shaped strap members 95 and 96 having laterally directed horizontal portions 97 and 98 which are connected, respectively, as by welding, to a pair of telescopically associated sleeve members 101 and 102, the sleeve member 102 fitting snugly over the upper end 103 of the sleeve 88. The strap members 95 and 96 include lower or depending sections 104 and 105 to which elongated brackets 106 and 107 are welded. These brackets overlap and are apertured, as at 109, to receive a pair of bolts 110 by which the two bracket members 95 and 96 are connected together. A stub shaft 112 is received in an aperture 113 formed in a depending hanger 114 connected at its upper end to the horizontal portion 97 of the strap member 95, the other end of the stub shaft 112 extending through an aperture 116 in the vertical portion 104 of the strap member 95. A short piece 117 is welded to the end of the stub shaft 112 and is apertured to receive a bolt 118 by which the stub shaft 112 is held in position. Mounted for rotation on the stub shaft 112 is a compound gear member 120 which includes a sprocket 121 and a drive pinion 122. The latter member meshes with a bevel gear 123 which is mounted for rotation on the sleeve section 102 and rotates about the axis of the upper section 87 of the wheel spindle 82. Apertured lugs 125 and 126 are fixed to the lower end of the strap sections 104 and 105 and are apertured to receive a pin on which an idler sprocket 127 is mounted for rotation. A drive chain 128 is trained over the drive sprocket 85, the sprocket section 121 of the compound gear 120 and the idler sprocket 127. The lugs 125 and 126 are extended rearwardly, as best shown in Figure 2, and are slotted to receive a chain-tightener sprocket 129. By this means the sprocket 85 on the land wheel 14 drives the compound gear member 120 and the latter in turn drives the bevel gear member 123. In order to keep the several driving parts, just mentioned, in alignment, the bracket 94 is caused to turn with the wheel spindle 82 by means of a bolt 131 which is extended through openings in the overlapping portions of the sleeves 101 and 102 and an opening 132 in the upper end of the vertical spindle section 87. Cooperating with the bolt 131 for anchoring the support 94 to the land wheel spindle 82 is a lug 134 welded to the land wheel spindle 82, as best shown in Figure 3, and apertured to receive a bolt 135 which securely fastens the intermediate portion of the inner idler support member 126 of the chain-tightener bracket to the lug 134.

A second shaft-supporting bracket 140 is provided, preferably being in the form of an angled member having a lower socket section 141 which is rigidly clamped to the wheel bracket sleeve 88 by any suitable means, such as a U-bolt 142. The upper and inner portions of the bracket 140 are provided with a bearing sleeve section 144 in which a stub shaft 145 is journaled. The outer end of the shaft 145 carries a pair of apertures 146, for a purpose which will be referred to below, and the inner end of the shaft 145, which extends radially with respect to the axis of swinging movement of the wheel spindle, carries a pinion 147 which meshes with the bevel gear 123 generally opposite the drive pinion 122. The bracket 140 is reenforced by a brace member 150 which is bolted, as at 148, to an apertured lug 149 (Figure 2) on the bracket 140 and to a lug 151 welded to the wheel bracket 15. The associated end of the brace 150 is threaded and receives a pair of lock nuts 152, one on each side of the lug 151. Thus, the bracket 140 is connected so as to become a fixed part of the disk tiller frame, being rigidly connected to the land wheel bracket or arm 15, as just described. A sprocket 154 having an apertured hub 155 is mounted on the outer end of the stub shaft 145 and is rigidly connected to the latter by means of a pin 156 insertable in one of the openings 146, the sprocket normally being in the position shown in Figure 3. The pinion 147, shaft 145 and adjustable gear 154 constitute the equivalent of a second compound gear, similar to the compound gear 120 mentioned above.

When the seeding attachment is arranged with the main seed box and one or more auxiliary seed boxes, a sprocket 161 (Figure 6) is mounted on the jackshaft section 68 and is connected with the drive sprocket 154 by means of a driving chain 162. The sprocket 161 is connected to the shaft 68 by means of a clutch unit 164 (Figure 5). The clutch unit 164 comprises a first collar 165 fixed, as by a set screw 166, to the shaft 68, the set screw 166 entering a hole or recess in the shaft 68. The sprocket 161 includes clutch teeth which cooperate with the corresponding clutch teeth formed on a companion axially shiftable clutch member 167 which is biased for movement toward the sprocket 161 by means of a spring 168. This spring bears at one end against the clutch member 167 and at the other end against a second collar 169 that is fixed by means of a set screw 170 to the jackshaft 68. A rocking member 173 is disposed between the sprocket 161 and the clutch member 167, the two latter members having relative axial movement. The clutch-controlling member 173 is provided with an arm 174 which is apertured and receives the upper end of a controlling link 176, the lower end of which extends through a swivel 177 pivoted to an arm 178 that is connected with the adjacent disk gang bail member 33. Preferably, the arm member 178 includes an arm section 179, a collar section 181 and a pin 182 or the like which connects the collar section 181 to the forwardly directed end of the associated bail. The link 176 carries a pair of collars 180, and a spring 185 is disposed between the swivel 177 and the upper collar 180. Rocking movement of the associated bail member 33, incident to raising and lowering of the disk gangs, acts through the arm 178 and the link 176 to rock the member 174. The latter has an angled face cooperating with an angled face on a stationary member 183 which is anchored to the frame as explained below. By virtue of the angled faces on the rocking member 174 and the stationary member 183, the rocking movement of the member 174 acts to engage and disengage the clutch 164. The present invention is not especially concerned with the particular details per se of the clutch unit 164.

Under some conditions, as when operating in arid sections where relatively small quantities of grain are sown, it may be desirable to reduce the rate of rotation of the seeding mechanisms below that normally required. To this end, I provide knock-out sections in the rear walls of the main and auxiliary seed boxes, so that when desired a speed-reducing unit 191 may be mounted on the seed box, for example, on the rear portion of the seed box of the auxiliary unit 61. Referring now to Figure 7, the speed-reducing unit 191 comprises a pair of supports 193 and 194 mounted by bolts 195 or the like attached to the front wall of the seed box when the knock-out sections 190 are removed. The lower portions of the brackets 193 and 194 carry bearing means 196 and 197 in which a stub shaft 198 is rotatably mounted. Fixed to the shaft 198 is a small gear sprocket 199 and a larger sprocket 201, both fixed to the shaft 198. The speed-reducing unit 191 is arranged so that the smaller sprocket 199 lies in the plane of the seeding mechanism sprocket 161, being connected therewith by a drive chain 202. The larger sprocket 201 of the speed-reducing unit 191 receives a drive chain that extends from the caster wheel sprocket member 154, preferably the chain 162. However, in order to drive the sprocket 201 from the shaft 154, it is necessary to reverse the sprocket 154 (Figure 4) so as to bring the plane of the same laterally outwardly so as to lie coincidental with the plane of the sprocket 201. With the parts arranged in this manner, the rate of actuation of the seeding mechanism is reduced as compared with the rate which obtains when the sprocket 154 on the shaft 145 drives the seeding sprocket 161 directly. It will be understood, of course, that if it should be desired for the reason to increase the rate of seeding, the sprockets 199 and 201 may be interchanged. A chain tightener 205 for the chain 202 may be provided if desired. Preferably, the chain tightener 205 is in the form of a flat spring having a rounded end 206 adapted to ride on top of the chain 202 and secured at its upper end, as at 207, to the seed box 40.

Each seeding mechanism 51 is provided with a seed tube 210, as shown in Figure 6, and in order to prevent interference between the seed tubes and the operating connections for the bail members 33, which are on the rear side of the frame pipe members, I provide a number of seed tube supports 212 which serve to support the grain tubes, particularly when the disk gangs are raised. The lower end of each of the seed tubes 210 is supported by a rod 213 that is fixed, as by a pair of lock nuts 214, to an angle 216 which extends along the brackets 41 and is fixed to the associated supporting strap members 43. The angle 216 also carries an anchoring lug 221 which cooperates with the stationary clutch control member 183, as best shown in Figure 6.

From the above description it will be seen that I have provided a seeding attachment, particularly adapted for disk tillers and the like, in which the drive for the seeding means is such that the drive is taken from a caster ground wheel but the arrangement is such that the castering of the ground wheel does not interfere with the proper drive. Also, the drive mechanism is readily connected with the seeding shafts irrespective of whether one or more, or none, of the auxiliary seeding units are incorporated in the machine.

Having described the preferred form of my invention, it is to be understood that my invention is not to be limited to the particular details shown and described above, but that, in fact, widely different means may be employed in the practice of the broader aspects of my invention.

What I claim, therefore, and desire to secure by Letters Patent is:

1. Caster drive wheel means for a seeder, comprising a pair of pivotally connected gear frames, means for mounting said frames on said seeder so that their axis of pivotal interconnection coincides with the axis of castering of said wheel, a shaft carried by each of said frames, a gear mounted for rotation on said seeder about the axis of turning of said spindle, a gear pinion on each of said shafts meshing with said gear, driving means connected with one of said pinions, and seeder drive means connected with the other gear pinion.

2. In a seeding attachment for an agricultural implement having a frame, and a castering wheel spindle swingably connected with said frame, and a caster wheel on said spindle, a caster drive wheel means comprising a gear mounted for rotation about the axis of turning of said spindle, a bracket attached to the upper end of said spindle so as to turn therewith, means including a part carried by said bracket drivingly connecting said gear with said caster wheel, a second bracket attached to said wheel spindle, and seeder drive means on said second bracket driven from said gear.

3. Caster drive wheel means for a caster wheel and spindle arrangement, said caster drive wheel means including a vertical sleeve rotatable on said spindle, a gear mounted for rotation about said vertical sleeve, a gear bracket fixed to said spindle above and below said sleeve so as to turn relative to the latter with said spindle, means including a gear rotatably supported by said gear bracket and meshing with said first mentioned gear for driving the latter from said caster wheel, a second gear bracket fixed to said vertical sleeve below said first gear and carrying a gear member meshing with said first gear, and implement drive means connected with said latter gear member.

4. For use with an agricultural implement that includes a frame, a wheel bracket fixedly connected with said implement frame and including a vertical sleeve, a ground wheel and a castering wheel spindle receiving said ground wheel and swingably mounted in said vertical sleeve, the improvement comprising caster drive wheel means comprising a sprocket attachable to said wheel, a gear rotatable about the upper portion of said vertical sleeve, a gear bracket rotatable relative to said sleeve and attachable to said spindle below said sleeve so as to turn relative to the latter with said spindle, a shaft carried by said bracket and carrying a pinion meshing with said gear, a sprocket on said shaft, a chain trained over said latter sprocket for driving the latter sprocket from the sprocket on said wheel, a second bracket, means on the latter to connect said second bracket with said frame, a shaft carried by said latter bracket in radial relation with respect to the axis of turning of said spindle and carrying a pinion meshing with said gear, and drive means connected to be driven from said latter shaft.

5. For use in an agricultural implement or the like, driving means comprising a pair of pivotally inter-connected frames, a gear member carried by said frames for rotation about the axis of their pivotal connection, a stub shaft carried by each of said frames, a compound gear member mounted for rotation on each of said shafts, each of said compound gear members including a pinion meshing with said first mentioned gear and a sprocket fixedly connected with said pinion, means including an endless chain trained over the sprocket associated with one of said pivotally interconnected frames, for driving the associated gear members and the other sprocket, and an endless chain trained over the other sprocket for transmitting the drive to a point of utilization.

6. For use in an agricultural implement or the like, driving mechanism comprising a pair of pivotally interconnected frames, a sleeve member disposed in the pivot axis of and serving to pivotally connect said frames, a gear journaled for rotation about said sleeve, a stub shaft mounted in each of said frames, a gear mounted on each of said stub shafts and including a pinion section meshing with said one gear, drive transmitting means connected with one of said pinion sections, and drive transmitting means connected with the other pinion section and adapted to transmit power to a point of utilization.

7. For use in an agricultural implement or the like, driving means comprising a pair of pivotally inter-connected frames, a gear member carried by said frames for rotation about the axis of their pivotal connection, a stub shaft carried by each of said frames, a compound gear member mounted for rotation on one of said shafts and including a pinion meshing with said first mentioned gear and a sprocket fixedly connected with said pinion, pinion and sprocket means mounted on the other of said stub shafts, said last mentioned pinion also meshing with said gear member, means including an endless chain trained over the sprocket associated with one of said pivotally interconnected frames, for driving the associated gear members and the other sprocket, and an endless chain trained over the other sprocket for transmitting the drive to a point of utilization.

8. The combination with an agricultural implement having a driven unit that includes a pair of laterally spaced apart drive chain receiving means, said two means being disposed in generally parallel planes, of drive means to drive said unit, including a shaft and a laterally shiftable sprocket attachable thereto in either of two positions axially thereof, one position being in the plane of one of said means and the other position being in the plane of the other of said means, and a driving chain connecting said sprocket with one of said drive chain receiving means.

References Cited in the file of this patent
UNITED STATES PATENTS

| | | |
|---|---|---|
| 140,694 | Fulghum | July 8, 1873 |
| 529,266 | Hill | Nov. 13, 1894 |
| 760,442 | Fry | May 24, 1904 |
| 2,235,427 | Harris | Mar. 18, 1941 |
| 2,672,762 | Northcote | Mar. 23, 1954 |